INVENTOR.
N. ERIC JOHANSON
BY James J. Cannon
ATTORNEY.

United States Patent Office 3,536,967
Patented Oct. 27, 1970

3,536,967
VARIABLE CAPACITOR
Norman Eric Johanson, Boonton, N.J., assignor to Johanson Manufacturing Corporation, Boonton, N.J.
Filed Aug. 29, 1968, Ser. No. 756,164
Int. Cl. H01g 5/04
U.S. Cl. 317—249                 1 Claim

ABSTRACT OF THE DISCLOSURE

A solderless tubular air capacitor including rotor and stator end members held in axially spaced relation by means of a ceramic support tube end portions of which are press-fitted in cylindrical openings in said end members, and wherein tubular capacitor plates are concentrically arranged in intermeshed relation with the ceramic support tube and secured in place by end portions thereof being press-fitted with respect to annular wall surfaces of annular recesses provided in said rotor and stator members.

---

This invention relates to electrical capacitors and is directed particularly to an improved solderless high-frequency tubular air capacitor.

In tubular air capacitors heretofore known, the rotor and stator elements were aligned by soldering with respect to supporting structures while held on accurately machined arbor. While such construction is satisfactory for most applications, it is not suitable under unusual stress conditions, nor for VHF applications which often require connector lugs to be soldered directly to the capacitor. In such instances, the capacitor was subject to being distorted by the application of too much heat, thereby effecting substantial changes in capacitance.

It is accordingly the principal object of this invention to provide a new and improved solderless high-frequency tubular air capacitor which obviates the above-described deficiencies of tubular air capacitors heretofore devised. A more particular object is to provide an improved capacitor of the character described wherein stator plates in the form of tubular elements are press-fitted with respect to concentric annular wall portions in the stator support member, wherein the stator support member and a rotor support member are retained in relatively fixed coaxial disposition by an accurately ground ceramic tube press-fitted between concentric annular wall portions of said stator and rotor support members, in outwardly spaced concentric relation with respect to the stator elements, and wherein rotor plates in the form of tubular elements are press-fitted either with respect to annular wall portions of a rotor support member axially adjustable with respect to the rotor support member or, as in the case of a fixed capacitor, with respect to annular wall portions of the stator support member.

Another object of the invention is to provide a solderless capacitor in which, in its fixed capacitor form, precision of capacitance can readily be achieved by controlling the depth to which the rotor and stator structures are pressed together.

Other objects are to provide a solderless capacitor of the above nature which will be comparatively compact and wherein terminal conductors can be soldered directly to the electrodes, thereby achieving shorter electrical paths, of particular importance in VHF applications.

Other objects, features and advantages of the invention will be apparent from the following description when read with reference to the accompanying drawings. In the drawings, wherein like reference numerals denote corresponding parts throughout the several views.

Figure 1:
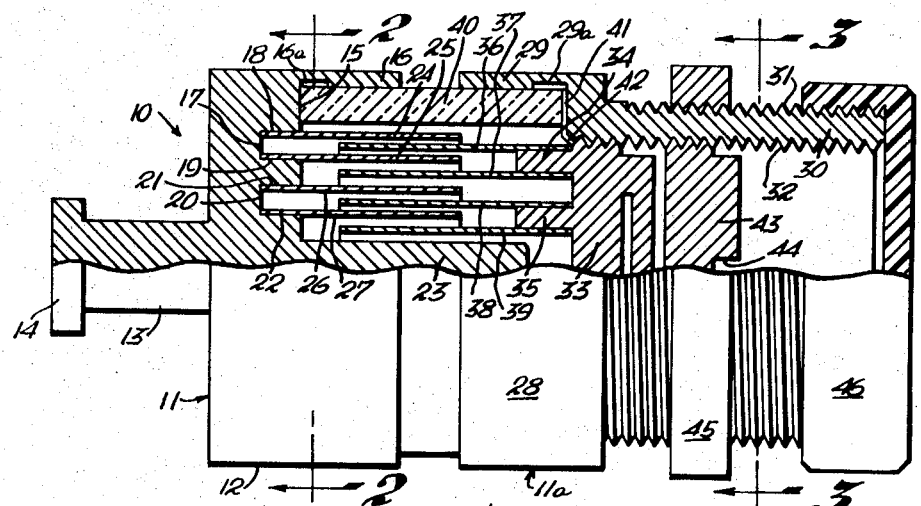
FIG. 1 is a side view, partly in longitudinal section, of a solderless adjustable capacitor embodying the invention.
Figure 2:
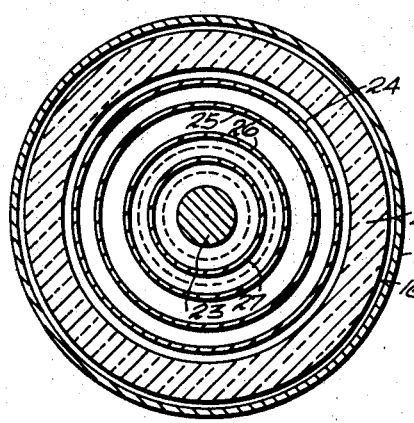
FIG. 2 is a transverse cross-sectional view taken along the line 2—2 of FIG. 1 in the direction of the arrows.
Figure 3:
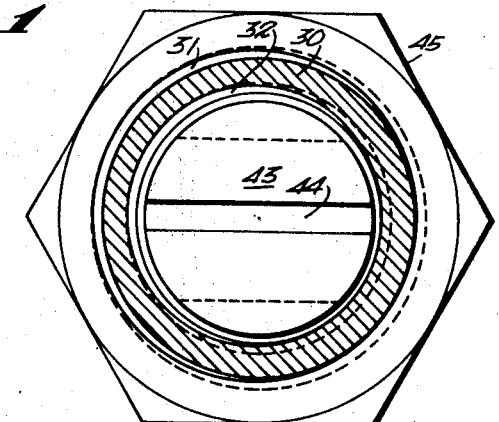
FIG. 3 is a transverse cross-sectional view taken along the line 3—3 of FIG. 1 in the direction of the arrows.

Referring now in detail to the drawings, and considering first the variable solderless capacitor designated, generally, by the reference numeral 10 in FIGS. 1, 2 and 3, the same comprises a stator support member 11, which is preferably integrally formed of an electrically conductive material such as brass, having a cylindrical body portion 12, and a coaxial, outwardly extending, reduced-diameter stem portion 13, the outer end of which has a cylindrical head 14. The inner end of the body portion 12 is provided with a first annular recess 15 defining a peripheral annular flange 16. A second annular, coaxial recess 17 in the bottom of the first recess 15 defines outer and inner concentric annular walls 18 and 19, respectively; and a third annular recess 20, of still lesser diameter, defines inner and outer concentric annular walls 21 and 22, respectively. The cylindrical body portion 12 is also formed with a coaxial, cylindrical projection 23 of still lesser diameter than that of the third annular recess 20. Tubular stator plate elements 24, 25, 26, and 27, of equal length but of different diameters, are press-fitted in coaxial relation with respect to outer wall 18, inner wall 19, outer wall 21 and inner wall 22, respectively.

The variable capacitor further comprises a rotor support member 11a, also of metal, having a cylindrical body portion 28 formed with a peripheral flange 29. The body portion 28 comprises an inwardly offset, reduced-diameter, coaxial cylindrical body portion 30, externally threaded as indicated at 31, and internally threaded as indicated at 32. Threadingly received within the body portion 28 is an externally threaded, cylindrical rotor element carrier 33 integrally formed with concentric annular projections 34, 35 defining inner and outer concentric, annular wall portions press-fitted over which are tubular rotor elements 36, 37, 38, and 39 of the same length but of graduated diameters.

The stator and rotor support members 11, 11a, are fixed in coaxial relation by means of a tubular ceramic support member 40, the ends of which are press-fitted to the interior wall surfaces of the peripheral flanges 16, 29, respectively, of said support members. As a means of reducing stress concentrations at interior corners portions of the peripheral flanges 16, 29, they are preferably undercut thereat, as indicated at 16a and 29a, respectively.

As a means of effecting a positive stop for the rotor element carrier 33 at its innermost position, a thin, resilient stop ring 41 is fitted between the end of the ceramic support member 40 and the rotor support member 11a. The inner periphery of the ring 41 is integrally formed with a sidewardly, outwardly bent annular portion 42 making an angle of about 45 degrees at approximately the same diameter as that of the internal threads 32 of the reduced diameter portion 30 of the rotor support member 11a. The outwardly bent portion 42 engages with the rotor element carrier 33 when at its inward limit position of adjustment, thereby preventing over travelling and possible electrical shortage. A cylindrical lock nut 43 threadable against the outside of the rotor element carrier 33 and having a diametrical kerf 44 for a screwdriver adjustment thereof serves to lock said rotor element carrier in adjusted position. A hexagonal lock nut 45 threadable along the outside of the reduced diameter portion 30 of the rotor support member 11a is provided for mounting the condenser in a suitable chassis opening, or the like. An end cap 46, preferably of nylon threadable on the outer end of the reduced diameter portion 30, is provided for closing off the end of the rotor support member 11a after adjustment of the rotor element carrier 33 to the desired capacitance is made.

It will be noted that the tubular stator elements 24, 25, 26 and 27 and the tubular rotor elements 36, 37, 38 and 39 are so arranged and spaced in their respective stator and rotor support members 11 and 11a, that they fit in intermeshed or interspaced relation, the rotor element 39 also being of such inner diameter as to be radially spaced from the outer periphery of the axial cylindrical projection 23 of the stator cylindrical body portion 12.

Figure 4:
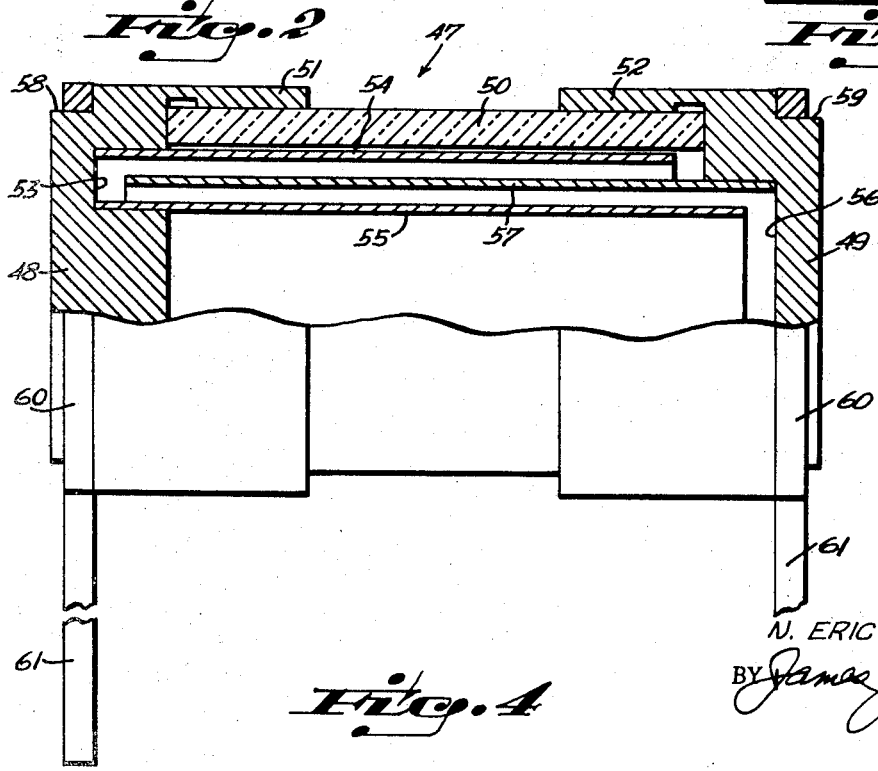
FIG. 4 is a side view, partly in longitudinal section, of a fixed capacitor embodying the invention.

Referring to FIG. 4 there is illustrated therein a modification of the invention in the form of a fixed solderless capacitor indicated generally by reference numeral 47. The fixed capacitor 47 comprises opposed, cylindrical capacitor element support members 48, 49 secured in spaced, coaxial relation by an accurately ground tubular ceramic support member 50 press-fitted at each end within the peripheral flanges 51, 52, respectively, of said support members. The support member 48 is provided with an interior, concentric annular recess 53 press-fitted within which, against the opposite annular side walls thereof, are tubular capacitor elements 54, 55. The support member 49 is formed with a concentric, cylindrical recess 56 press-fitted within which, against the peripheral side wall thereof, is a tubular capacitor element 57, of such diameter as to fit between the tubular capacitor elements 54, 55 of the support member 48. The outer ends of the support members 48, 49 are formed with reduced-diameter portions 58, 59, respectively, defining annular shoulder for the press-fit reception thereon of conductor rings 60, each of which is integrally formed with an outwardly extending conductor lug portion 61 for electrical connection, as by soldering, to the capacitor.

The fixed solderless capacitor 47 will be assembled by first press-fitting the tubular elements 54, 55 and 57 to their respective support members 48 and 49, and then aligned by pressing said support members over the ends of the tubular ceramic support member 50. An important advantage of this fixed capacitor construction resides in the fact that precision values of capacitance can be achieved by controlling the depth of interengagement of the support members with respect to the ceramic support member 50. Thus, by monitoring capacitance during its assembly, precise capacitance values can readily be obtained.

While there is illustrated and described herein only two forms in which the invention can conveniently be embodied in practice, it is to be understood that these forms are presented by way of example only and not in a limiting sense. The invention, in brief, comprises all the modifications and embodiments coming within the scope and spirit of the following claim:

What I claim is new and desire to secure by Letters Patent is:

1. A solderless tubular air capacitor comprising, in combination, a pair of axially spaced end members, a tubular ceramic support member, end portions of said ceramic support member being press-fitted in coaxial cylindrical recess, in said end members, a first plurality of tubular plate elements having mutually different diameters press-fitted at end portions thereof with respect to annular wall surfaces of coaxial annual recess provided in one of said support members, said other of said support members comprising a rotor carrier member, and means for adjustably positioning said rotor carrier member along the axial direction with respect to said one of said support members, a second tubular plate element press-fitted into annular recesses in said rotor carrier member, said rotor carrier member comprising a central, internally-threaded through opening in said other of said support members, said rotor carrier member being externally threaded and threadable along said internally threaded opening, and stop means comprising an annular stop ring fitted between one end of said ceramic support member and said other of said support members, said stop ring being formed with a sidewardly outwardly bent inner peripheral portion of substantially the same diameter as that on said central threaded opening.

References Cited

UNITED STATES PATENTS

| | | | |
|---|---|---|---|
| 1,772,839 | 8/1930 | McIver | 317—251 X |
| 1,996,729 | 4/1935 | Rigante | 317—249 X |
| 2,224,659 | 12/1940 | Stoll | 151—70 X |
| 2,339,663 | 1/1944 | Teare | 317—244 X |
| 2,454,102 | 11/1948 | Stacy | 317—242 |
| 2,464,716 | 3/1949 | Piton | 317—251 X |
| 3,336,515 | 8/1967 | Seiden. | |

FOREIGN PATENTS

| | | |
|---|---|---|
| 646,215 | 7/1928 | France. |
| 805,463 | 11/1936 | France. |

ELLIOT GOLDBERG, Primary Examiner

U.S. Cl. X.R.

317—251